United States Patent
Schulz et al.

(10) Patent No.: US 9,869,400 B2
(45) Date of Patent: Jan. 16, 2018

(54) VALVE DEVICE

(71) Applicant: HYDAC FLUIDTECHNIK GMBH, Sulzbach/Saar (DE)

(72) Inventors: Frank Schulz, Blieskastel-Bierbach (DE); Michael Reik, Saarbruecken (DE); Philipp Hilzendegen, Wadern (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 15/024,055

(22) PCT Filed: Nov. 18, 2014

(86) PCT No.: PCT/EP2014/003070
§ 371 (c)(1),
(2) Date: Mar. 23, 2016

(87) PCT Pub. No.: WO2015/086107
PCT Pub. Date: Jun. 18, 2015

(65) Prior Publication Data
US 2016/0230900 A1    Aug. 11, 2016

(30) Foreign Application Priority Data
Dec. 13, 2013    (DE) .................. 10 2013 020 585

(51) Int. Cl.
*F16K 11/10*    (2006.01)
*F15B 1/027*    (2006.01)
(Continued)

(52) U.S. Cl.
CPC ............ *F16K 11/105* (2013.01); *F15B 1/027* (2013.01); *F15B 13/028* (2013.01);
(Continued)

(58) Field of Classification Search
CPC ......... Y10T 137/2567; Y10T 137/2569; F15B 13/028; F15B 15/149; F15B 1/027;
(Continued)

(56) References Cited

U.S. PATENT DOCUMENTS 1,919,430 A * 7/1933 Hewitt ................. F16K 11/048
137/112
2,311,851 A * 2/1943 McClure ............... F16K 15/025
137/113
(Continued)

FOREIGN PATENT DOCUMENTS

DE         2 213 244    9/1973
DE    10 2004 052 895    6/2006
(Continued)

OTHER PUBLICATIONS

International Search Report (ISR) dated Apr. 29, 2015 in International (PCT) Application No. PCT/EP2014/003070.

*Primary Examiner* — William McCalister
(74) *Attorney, Agent, or Firm* — Wenderoth, Lind & Ponack, L.L.P.

(57) ABSTRACT

A valve device, in particular a double stop-check valve, preferably of the two-way valve type, has at least three fluid connections (1, 2, 3) provided in a valve housing (51). Two valve elements (65, 67) can slide in the valve housing (51). One control device (71) controls the valve elements (65, 67). At least one of the valve elements (65, 67) forms, together with parts (59/61) of the valve housing (51), a seat leak-tight closure part for the associated fluid connections (1, 2, 3).

20 Claims, 5 Drawing Sheets

(51) Int. Cl.
*F15B 13/02* (2006.01)
*F15B 15/14* (2006.01)
*F16K 15/02* (2006.01)
*F16K 31/122* (2006.01)

(52) U.S. Cl.
CPC .......... *F15B 15/149* (2013.01); *F16K 15/026* (2013.01); *F16K 31/1221* (2013.01); *F16K 31/1225* (2013.01); *F15B 2211/20561* (2013.01); *F15B 2211/212* (2013.01); *F15B 2211/27* (2013.01); *F15B 2211/3052* (2013.01); *F15B 2211/30515* (2013.01); *F15B 2211/7053* (2013.01); *F15B 2211/785* (2013.01); *Y10T 137/2567* (2015.04); *Y10T 137/2569* (2015.04)

(58) Field of Classification Search
CPC ...... F15B 2211/20561; F15B 2211/212; F15B 2211/27; F15B 2211/30515; F15B 2211/3052; F15B 2211/7053; F15B 2211/785; F16K 11/105; F16K 15/026; F16K 31/1221; F16K 31/1225
USPC .................................................. 137/112, 113
See application file for complete search history.

(56) References Cited

U.S. PATENT DOCUMENTS

| | | | | |
|---|---|---|---|---|
| 2,634,743 A | * | 4/1953 | Pierre | F15B 7/003 137/112 |
| 2,754,659 A | * | 7/1956 | Dick | F02M 21/00 137/113 |
| 3,107,681 A | * | 10/1963 | May | B60T 17/18 137/112 |
| 3,155,105 A | * | 11/1964 | Yanna | B60T 11/18 137/112 |
| 3,437,065 A | * | 4/1969 | Robbins, Jr. | B63G 8/26 114/125 |
| 3,528,243 A | * | 9/1970 | Vanzandt | B62D 11/183 137/112 |
| 3,925,987 A | * | 12/1975 | Faisandier | F16H 39/02 137/112 |
| 4,261,381 A | * | 4/1981 | Geiling | B60G 17/033 137/101 |
| 4,343,601 A | * | 8/1982 | Thorson | F01C 20/20 137/112 |
| 4,605,262 A | * | 8/1986 | Bartholomew | B60T 15/24 137/112 |
| 4,759,261 A | * | 7/1988 | Flieter | F04B 53/08 137/112 |
| 4,889,152 A | * | 12/1989 | Wilson | F17C 13/045 137/102 |
| 6,050,081 A | * | 4/2000 | Jansen | F02C 7/232 137/112 |
| 2009/0078111 A1 | | 3/2009 | Hyang | |

FOREIGN PATENT DOCUMENTS

| | | |
|---|---|---|
| EP | 1 167 843 | 1/2002 |
| EP | 1 705 411 | 9/2006 |
| EP | 2 048 372 | 4/2009 |
| FR | 2 201 420 | 4/1974 |
| JP | 2012-77890 | 4/2012 |
| JP | 2013-60982 | 4/2013 |

* cited by examiner

// VALVE DEVICE

FIELD OF THE INVENTION

The invention relates to a valve device, in particular an unlockable double check valve, preferably of the two-way valve type. The valve device has at least three fluid connections in a valve housing. At least two valve elements are displaceable in the valve housing. At least one control device controls the respective valve elements.

BACKGROUND OF THE INVENTION

Valve devices of this type are state of the art. Such valve devices are used as two-way valves in hydraulic and pneumatic circuits, in which a logical OR link of pressure signals is required. Two-way valves have two inlet connections and one outlet connection on the valve housing. The two-way valve has two defined switch positions. In each switch position, an inlet connection to the assigned valve element is always closed and the other inlet connection is opened, so that fluid can reach the outlet connection from the opened fluid connection. If both fluid inlets are pressurized, in the case of a conventionally designed two-way valve, the respective valve element opens the inlet connection conveying the higher pressure, while the other inlet connection having a lower level of pressure is closed. In another design, as a reverse two-way valve, the respective valve element closes the inlet connection conveying the higher pressure, while the fluid connection conveying the lower pressure is opened toward the outlet connection.

In the case of a two-way valve formed as a double check valve, which has two valve elements, each of which is assigned to a fluid connection 1 and a fluid connection 2 forming an inlet connection. A control device in the form of a connecting element is provided between the valve elements, which connecting element couples the valve elements with one another during their movements between opened and closed positions. In the prior art, the valve elements are formed by switching balls, so that each check valve is formed by a ball valve.

SUMMARY OF THE INVENTION

An object of the invention is to provide an improved valve arrangement of the aforementioned type, which features particularly advantageous operating behavior.

According to the invention, this object is basically achieved by a valve device having, as a significant characteristic of the invention, at least one of the valve elements, together with parts of the valve housing, that forms a seat leak-tight closure part for the assigned fluid connection point. The replacement of the switching ball of a conventional ball valve with a seat leak-tight closure part that cooperates with assigned housing parts avoids the problems associated therewith encountered in the prior art. Forming the respective valve element with a seat leak-tight closure part allows a two-way valve to be implemented, in which all connections are non-leaking in the unactuated switch position and, in particular, a positively overlapped valve arrangement can be implemented.

In particularly advantageous exemplary embodiments, by contrast with the prior art, in which the valve elements of the double check valve are coupled with one another by a connecting element of the control device during their movements, the control device is designed such that it allows the valve elements to be controlled independently of one another. This independent control removes the serious disadvantage of the conventional valve arrangements, namely that in a respective opening process all three connections are briefly connected to one another. In the phase between the opening operation of a valve element and the closing operation of the other valve element in the prior art, a fluid short circuit is generated. With independently occurring activation of the valve elements, the switching operation can be configured such that the valve element assigned to the fluid connection to be opened performs its opening movement independent of the other valve element that remains in the closed position.

In an advantageous embodiment, the control device can have a rod-shaped control element that is displaceable in the valve housing in the direction of travel of the valve elements. During the displacement of the control element in the one or other direction of travel, the one or the other valve element can be carried along, independently of the respective other valve element.

In particularly advantageous exemplary embodiments, valve elements in the form of conical pistons are provided with a conical sealing surface that, in cooperation with an assigned sealing edge of the valve housing, forms a seat leak-tight closure. Thanks to the valve cone design, a fully leak-free closure can be implemented.

The arrangement may be obtained in a particularly advantageously manner, where the conical pistons are pretensioned in a closed position by an energy storage, preferably by a spring in each case. In a closed position, the one conical piston seals a first fluid connection assigned to it, and the other conical piston seals a second fluid connection assigned to it, in a leak-free manner in each case, against a third fluid connection, which adjoins both sealing edges.

In a particularly advantageous design of the control device, the rod-shaped control element has effective piston surfaces opposite one another. To the first piston surface, the pressure of the first fluid connection can be applied, and to the second piston surface pressure of the second fluid connection can be applied. The switching movements of the conical pistons serving as valve elements are thus not effected by direct pressure actuation from the associated fluid connection. Rather, as a result of mechanical control by the rod-shaped control element moved by pressure applied to its piston surfaces. This advantageously allows an independent and, in each case, optimized damping to be provided for the switching movements of each conical piston, by forming various choke positions in the connecting lines leading to the piston surfaces of the rod-shaped control element. Implementing an independent, individual damping for each conical piston in the switching operations is then possible.

When the valve device is designed as a standard two-way valve, the effective piston surfaces of the rod-shaped control element are connected with the fluid connection 1 or the fluid connection 2 in such a way that the control element is moved by the pressure of the fluid connection conveying the respective higher pressure, in a direction in which it moves the conical piston associated with the fluid connection of higher pressure out of the closed position and leaves the conical piston associated with the fluid connection of the lower pressure in the closed position. In the same way, the arrangement can, when designed as a reverse control valve, be such that the effective piston surfaces of the rod-shaped control element are connected to the fluid connections in such a way that the rod-shaped control element is moved, by the pressure of the fluid connection conveying the respective higher pressure, in a direction in which it moves the conical piston associated with the fluid connection of the lower pressure out of the closed position and leaves the conical piston associated with the fluid connection of the higher pressure in the closed position.

In particularly advantageous exemplary embodiments, the control element has the form of a round rod, which engages both conical pistons coaxially. Bore holes, starting from the end-side piston surfaces and extending along the displacement axis in the rod, form ducts for the fluid connection of the piston surfaces with the respective associated fluid connection 1 or 2. This arrangement has the particular advantage that, by replacing the rod serving as the control element, an otherwise identically constructed valve device can be formed as a standard two-way valve or as a reverse two-way valve, by providing rods with different bore holes that form a corresponding duct course for the connection of the piston surfaces with the desired fluid connection.

To implement the desired decoupling of the opening and closing movements of the conical pistons in a simple manner, a predefined no-load stroke of the control element can be provided for the carrying along of the conical pistons by the rod-shaped control element.

For an adaptation of the switching behavior to application-specific requirements, the effective piston surfaces of the rod-shaped control element can have different sized effective piston surfaces. In addition, the arrangement can advantageously be such that each conical piston has a piston surface that, when the pressure of the respective associated fluid connection is applied to it, increases the spring force acting on the conical piston. The non-leaking seat leak-tight closure is facilitated by the correspondingly increased sealing force. With an advantageous design of the conicity of the conical piston below the seat, the opening behavior can be positively influenced by the stroke, e.g. in the form of a dampened opening.

The valve concept according to the invention not only ensures the described seat leak-tightness, it creates a positively overlapped valve concept at the same time. During the switching of the valve together with associated valve elements, no fluid connection exists between at least two of the at least three employed fluid connections of the valve housing. Thanks to the positive overlapping, the connections can be switched independently of one another and, as described above, dampened accordingly. The seat leak-tightness alluded to additionally results in improved energy efficiency in operation of the valve device. Using the solution according to the invention for a reverse-operation valve in the manner described above has proven to be particularly advantageous.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
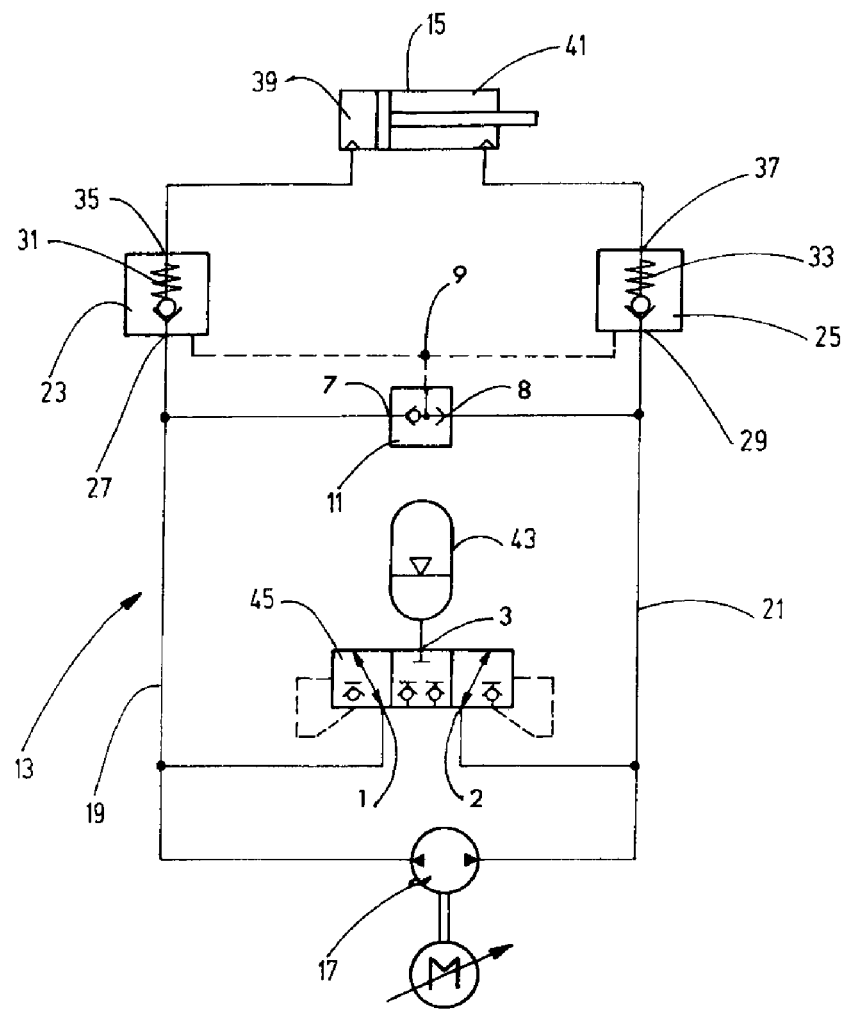
FIG. 1 is a schematic diagram of a hydraulic circuit for an exemplary application for two-way valves.

Of the multitude of possible applications for two-way valves, FIG. 1 shows, by way of an example, the use of a standard two-way valve 11 in a closed hydraulic circuit 13 for controlling a working cylinder 15. The hydraulic circuit 13 has a hydraulic pump 17 driven by an electric motor, which hydraulic pump builds up hydraulic pressure in a first line 19 or a second line 21 depending on the direction of rotational drive. Of the three fluid connections of the two-way valve 11, a first fluid connection 7 serving as an inlet connection is connected to the line 19, and a second fluid connection 8 serving as a second inlet connection is connected to the line 21. A third fluid connection 9 is an outlet connection and is connected both to a controlled openable check valve 23 and to a controlled openable check valve 25. The check valves 23, 25 have inlet connections 27 and 29, respectively, which are connected to the line 19 and the line 21, respectively. The respective inlet connection 27, 29 can be opened against the closing force of a respective spring 31 and 33 by the pressure signal at the third fluid connection 9 of the two-way valve 11, to connect an outlet connection 35 or 37 of the respective check valve 23, 25 to the piston chamber 39 or the rod chamber 41 of the working cylinder 15. In this arrangement, both check valves 23 and 25 supplying the working cylinder 15 can be opened from the fluid connection 9 of the two-way valve 11, irrespective of which of the lines 19 or 21 forms the pressure line or return line, depending on the direction of rotation of the pump 17. By selecting the drive of the pump 17, the operation of the working cylinder 15 can then be controlled. In the manner conventional for such hydraulic circuits, a pressure-maintaining and energy recovery unit having a hydraulic accumulator 43 and a directional valve 45 is inserted between the lines 19 and 21, respectively. The directional valve 45 is a reverse two-way valve with a closed central position. Its first inlet connection 1 and its second inlet connection 2 are connected to the line 19 and to the line 21, respectively. The outlet connection 3 is connected to the hydraulic accumulator 43.

Figure 2:
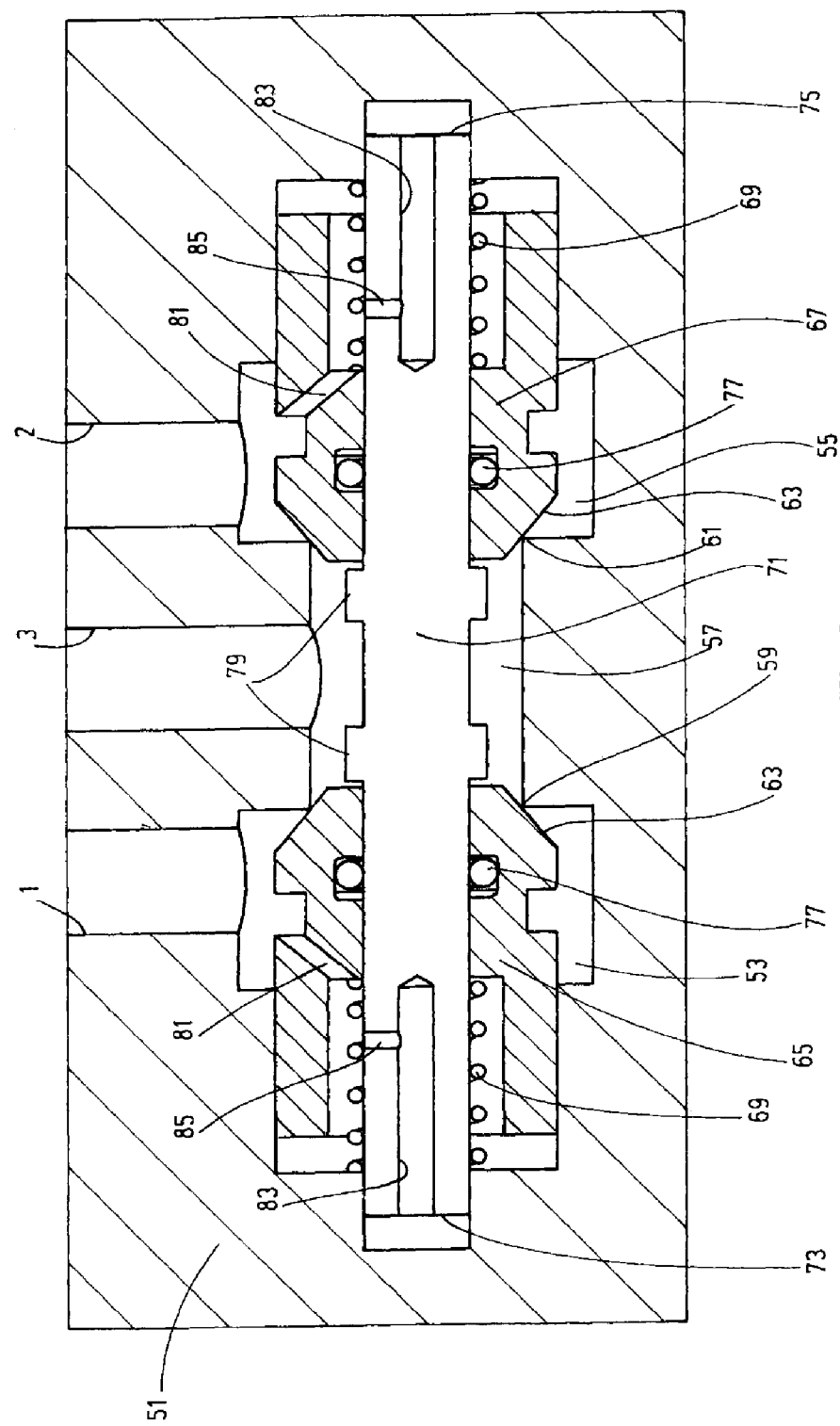
FIG. 2 is a side view in section, which is enlarged and depicted schematically simplified compared to an actual valve device, of a valve device according to a first exemplary embodiment of the invention in the form of a double check valve forming a reverse two-way valve.

FIG. 2 shows a first exemplary embodiment of the valve device according to the invention in the form of a double check valve, which forms a reverse two-way valve. The associated valve housing 51 has an inner workspace, which extends in the form of a stepped bore hole along an actuation displacement axis. Due to the formed steps, the workspace is divided into sections of different diameters. A fluid chamber 53 offset to the left of the central area is connected to the fluid connection 1 as an inlet connection of the housing 51. A fluid chamber 55 offset to the right of the central area is connected to the fluid connection 2 as a second inlet connection of the housing 51. A third or central fluid chamber 57 lying between them is connected to the fluid connection 3 as the outlet connection of the housing 51. The central fluid chamber 57 has a lesser diameter compared with the other fluid chambers 53, 55. The step of the valve housing 51 located at the transition from central fluid chamber 57 to the respective adjoining fluid chambers 53 and 55 in each case forms a sealing edge 59 and 61 for forming a seat leak-tight closure in cooperation with a conical surface 63, which is formed as a sealing surface on an associated conical piston in each case. In front of sealing edges 59, 61 are a first conical piston 65 assigned to the first fluid chamber 53 connected to the fluid connection 1 and a second conical piston 67 assigned to the fluid chamber 55 connected to the fluid connection 2. In the unactuated state depicted in FIG. 2, the left-side conical piston 65 forms, in cooperation with the sealing edge 59, a seat leak-tight closure part, while the conical piston 67 lying on the right-side forms, in cooperation with the sealing edge 61, a seat leak-tight closure part. In this state, all fluid connections 1, 2 and 3 are closed.

The conical pistons 65, 67 forming the valve elements of a double check valve are pretensioned in the closed position depicted in FIG. 2 by a respective pressure springs 69. Each spring 69 is supported on the surface of the conical pistons 65, 67 opposite the conical surface 63. For movements of the conical pistons 65, 67 out of the closed position as a result of pressure signals at the fluid connection 1 or fluid connection 2, a control device is provided having a control element that can be moved along the displacement axis. This control device is formed by a round control rod 71, which is displaceably guided in the housing 51, and which has at each of the end sides a respective piston surface 73 and 75 that can be pressurized by fluid. The rod 71 engages the conical pistons 65, 67 coaxially forming an inner guide, which allows a relative movement of the rod 71 and which is sealed by a respective sealing element 77 in the case of each conical piston 65, 67. The rod 71 has a carrying device between the pistons 65, 67, formed by two radial projections 79. One of projections 79 is located in proximity to an adjacent conical piston 65, 67. In movements of the rod 71 in the one or the other direction of displacement, the one or the other conical piston 65 or 67, upon completion of a short no-load stroke, which is determined by the amount of distance of the projections 79 from the adjacent conical piston 65, 67, is carried along and raised against the action of the respective assigned pressure spring 69 from the sealing edge 59 or 61, in order to connect the fluid connection 1 or the fluid connection 2 to the fluid connection 3 as an outlet connection.

As already mentioned, the example of FIG. 2 is constructed as a reverse two-way valve. This construction means that, in the case of a pressure signal at the fluid connection 1, its connection to the fluid connection 3 resulting from the abutment of the conical surface 63 of the conical piston 65 with the sealing edge 59 is closed, while the conical surface 63 of the other conical piston 57 is raised from the sealing edge 61, in order to connect the fluid connection 2 to the fluid connection 3. This opening movement of the conical piston 67 takes place by a displacement movement of the rod 71, during which the assigned projection 79 serving as a carrier contacts the conical piston 67 and moves the conical piston 67 against the force of the pressure spring 69 towards the right in FIG. 2. This movement of the rod 61 takes place by pressurizing the piston surface 73 with the pressure of the fluid connection 1. For this purpose, a diagonal bore hole 81 is formed in the conical piston 65, starting from the fluid chamber 53, which diagonal bore hole leads to the chamber surrounding the pressure spring 69. As additional connecting ducts to the piston surface 73, a bore hole 83 is formed in the rod 71, starting from the end thereof and extending along the displacement axis, together with a transverse bore hole 85.

For the reverse switching operation, during which the higher pressure signal is applied at the fluid connection 2, the other conical piston 67 likewise has a diagonal bore hole 81 to supply the piston surface 75 located at the right side end of the rod 71 with the pressure of the fluid connection 2 via a longitudinal bore hole 83 and a transverse bore hole 85 of the rod 71. Accordingly, the rod 71 moves to the left in FIG. 2 for correspondingly carrying the conical piston 65 along out of the closed position, so that the fluid connection 1 is opened. During the respective switching operations, the conical piston 65 or 67 not carried along by the displacement movements of the rod 71 remains in the closed position.

For an independent damping of the switching operations for each valve side, i.e. for the movements of the conical piston 65 and of the conical piston 67, choke points can be inserted via orifices into the respective assigned diagonal bore holes 81 and the transverse bore holes 85 of the rod 71, which choke points are not depicted in the drawings.

Figure 3:
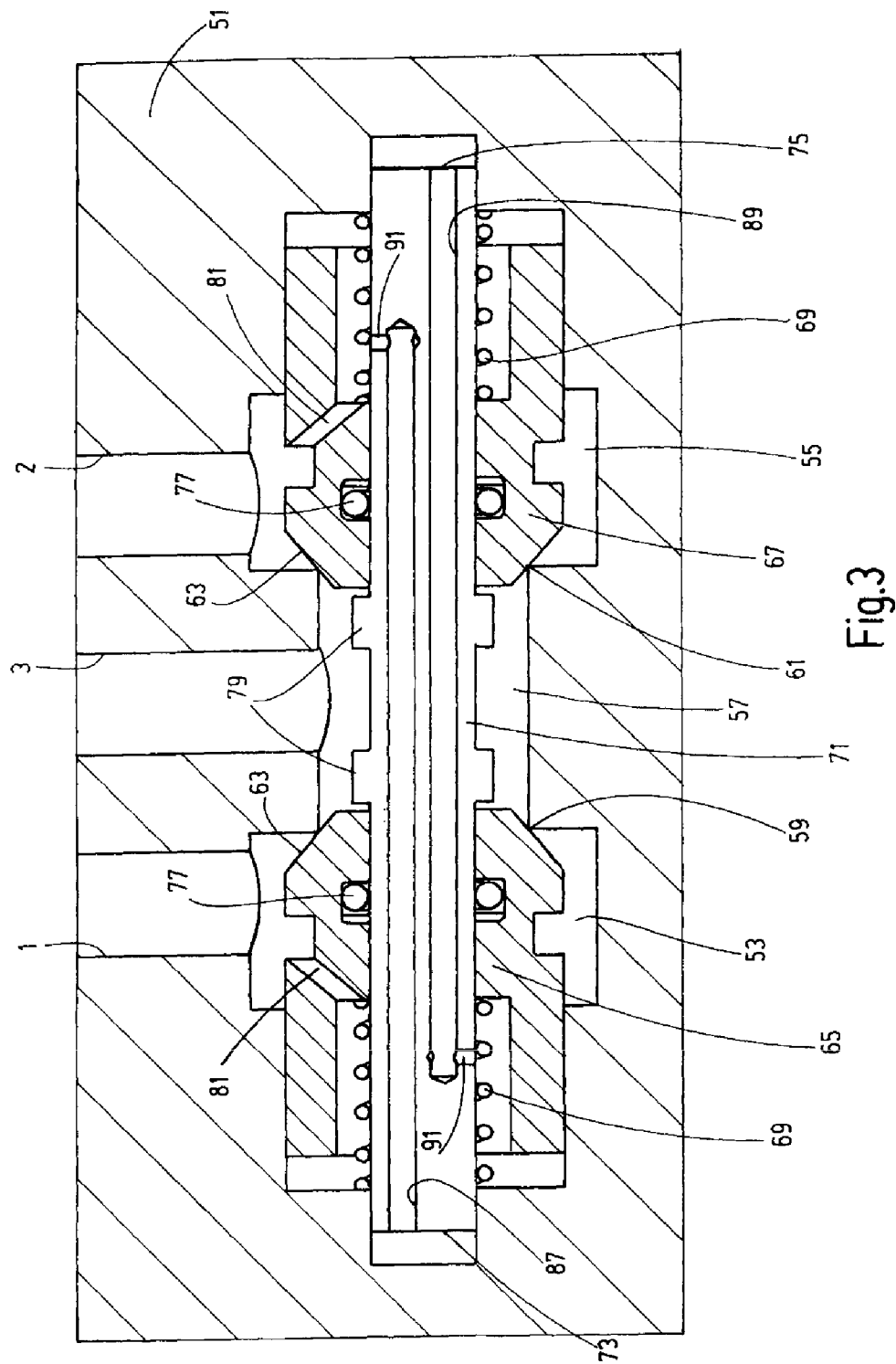
FIG. 3 is a side view in section, which is enlarged and schematically simplified compared to an actual valve device, of a valve device according to a second exemplary embodiment of the invention in the form of a standard two-way valve.

The second exemplary embodiment depicted in FIG. 3, which is constructed as a standard two-way valve, differs from the example of FIG. 2 merely by a different design of the ducts that extend in the rod 71 for the connection of the piston surfaces 73 and 75 to the fluid connections 1 and 2. For this purpose, the rod 71, starting from each piston surface 73 and 75, has a respective longitudinal bore hole 87 and 89, which extend parallel to one another. The first longitudinal bore hole 87 connects the piston surface 73 via a transverse bore hole 91 to the chamber of the conical piston 67 surrounding the spring 69. The other or second longitudinal bore hole 89 connects the piston surface 75 via a transverse bore hole 91 to the chamber of the conical piston 65 surrounding the spring 69. Aside from the reversed switching behavior compared with FIG. 2, the functionality corresponds to the example of FIG. 2. Choke points may also be formed in the diagonal bore holes 81. For a change of the operating behavior (standard/reverse), in the case of an otherwise identical valve design, replacement of the rod 71 having the respective required bore holes is sufficient.

Figure 4:
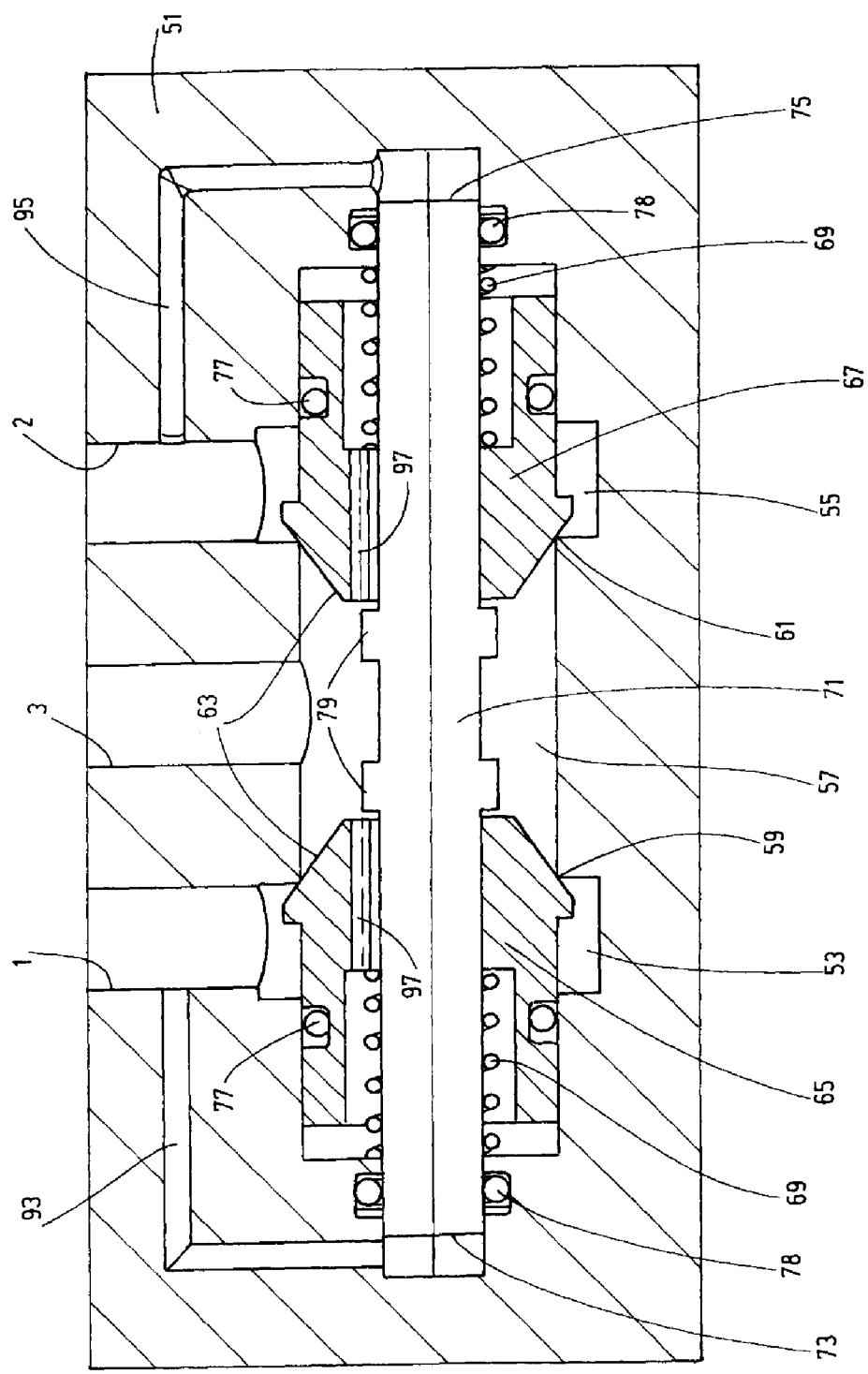
FIGS. 4 and 5 are side views in section of valve devices according to third and fourth exemplary embodiments, respectively, of the invention in the form of reverse two-way valves.

The third exemplary embodiment of FIG. 4 is constructed, like the example of FIG. 2, as a reverse two-way valve, with the difference compared with FIG. 2 being that the connections of the piston surfaces 73 and 75 of the rod 71 to the fluid connections 1 and 2 are not formed via bore holes of the rod 71. Rather these connections are formed by connecting lines 93 and 95 guided or extending in the valve housing 51, starting from the fluid connection 1 or from the fluid connection 2. The sides of the conical pistons 65, 67, which the respective pressure spring 69 adjoins, are thus not required as control pressure conveying pressure chambers providing a pressure compensation for the conical pistons 65, 67. To this end, a continuous longitudinal duct 97 is formed in each conical piston 65, 67. By contrast with the examples of FIGS. 2 and 3, the sealing does not take place by means of sealing elements 77 between the conical pistons 65, 67 and the housing 51, but rather by f sealing elements 78 between the rod 71 and the housing 51. If diagonal bore holes 81 are not included in the conical pistons 65, 67, a choking may be provided by way of an orifice in the line 93 and/or 95.

Figure 5:
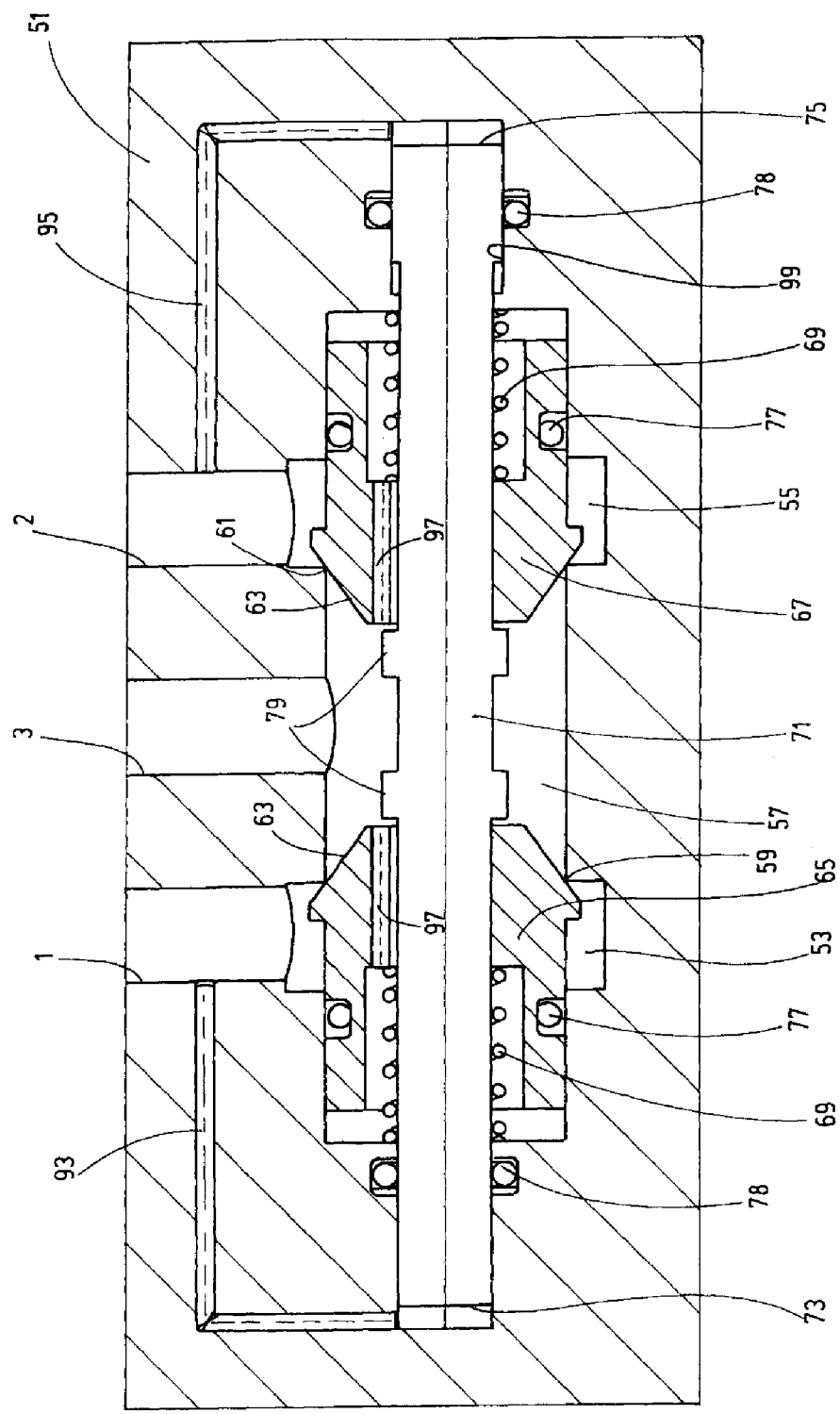

The fourth exemplary embodiment of FIG. 5 corresponds to the exemplary embodiment of FIG. 4, except that a rod section 99 with an enlarged diameter is provided on the rod 71 on an end part located on the right side in the drawing. Thus, in the exemplary embodiment of FIG. 5, the piston surface 75 has a larger effective area than the piston surface 73 of the other end. This surface area difference, according to the selection of the sizes of the piston surfaces 73, 75, permits adapting the switching behavior to respective application-specific requirements.

In the schematically simplified depictions of FIGS. 2 through 5, with respect to the valve housing 51, only the details functionally cooperating with the conical pistons 65, 67, such as the location of the fluid connections 1, 2, 3 and the assigned edges 59, 61, are depicted in detail. Because the rest of the structural design of the housing 51 can correspond to the prior art, details regarding the same are omitted for the sake of clarity. For the mounting of the movable functional parts, the housing 51 can be designed in multiple parts, which is depicted as one piece in the simplified depiction.

While various embodiments have been chosen to illustrate the invention, it will be understood by those skilled in the art that various changes and modifications can be made therein without departing from the scope of the invention as defined in the claims.

The invention claimed is:

1. A two-way check valve, comprising:
a valve housing;
first, second and third fluid connections in said valve housing;
first and second valve elements displaceably mounted in said valve housing, said first and second valve elements including first and second conical pistons having first and second conical surfaces, respectively;
a control device controlling displacement of said valve elements in said valve housing;
first and second seats in said valve housing forming leak-tight closures for the respective fluid connections with said first and second valve elements, respectively, said first and second seats including first and second sealing edges, respectively, in said valve housing and engaged by said first and second conical surfaces, respectively, to form said leak-tight closures, said first and second conical pistons being biased by first and second energy storages, respectively, toward closed positions thereof in which said first conical piston seals said first fluid connection and said second conical piston seals said second fluid connection in leak-free manners relative to said third fluid connection, said third fluid connection adjoining said first and second sealing edges; and
valve ducts in said valve elements and control ducts in said control device providing fluid communication between said first and second fluid connections and longitudinal ends of said control device.

2. A two-way check valve according to claim 1 wherein said control device implements a positively overlapped valve concept in which no fluid connection exists between at least two of said fluid connections during switching of said first and second valve elements.

3. A two-way check valve according to claim 1 wherein said first and second valve elements dampen said first and second fluid connections, respectively, during operation thereof.

4. A two-way check valve according to claim 1 wherein said control device controls said first and second valve elements independently of one another.

5. A two-way check valve according to claim 1 wherein said control device comprises a rod-shaped control element displaceable in said valve housing in a direction of displacement of said first and second valve elements; and during displacement of one of said valve elements, the other of said valve elements is movable relative said control element independently of the one of valve elements.

6. A two-way check valve according to claim 1 wherein said energy storages are springs.

7. A two-way check valve according to claim 1 wherein said control device comprises first and second piston surfaces directed in opposite directions on said control device, each of said first and second piston surfaces being connected in fluid connection with one of said first and second fluid connections.

8. A two-way check valve according to claim 7 wherein said first and second piston surfaces are connected in fluid communication with said first and second fluid connections, respectively, moving said control device by fluid pressure from said first connection having a higher pressure in a direction moving said first valve element associated with the first fluid connection out of a closed position to an open position thereof, while the second valve element remains in a closed position.

9. A two-way check valve according to claim 7 wherein said first and second piston surfaces are connected in fluid communication with said second and first fluid connections, respectively, moving said control device by pressure said first connection that has a higher pressure in a direction moving said second valve element associated with the second fluid connection having the lower pressure out of a closed position to an open position thereof, while the first valve element remains in a closed position.

10. A two-way check valve according to claim 1 wherein said control device comprises a round rod engaging and supporting said conical pistons coaxially and relatively movably, said round rod having a carrying device between said conical pistons, such that axial movement of said round rod in a first direction moves said first conical piston to an open position thereof and axial movement of said round rod in an opposite second direction moves said second conical piston to an open position thereof.

11. A two-way check valve according to claim 10 wherein bore holes extend in said round rod from end-side piston surfaces of said round rod along a displacement axis in said round rod forming said control ducts for providing fluid communication between the respective piston surfaces and the respective fluid connections.

12. A two-way check valve according to claim 10 wherein a predefined no-load stroke of said control device moves said conical pistons with said control element.

13. A two-way check valve according to claim 7 wherein said first and second piston surfaces have effective areas of different sizes.

14. A two-way check valve according to claim 1 wherein each said conical piston comprises a piston surface increasing biasing of the respective spring when fluid pressure is applied to the respective piston surface.

15. A two-way check valve, comprising:
a valve housing with first and second control guides and with first and second valve seats therein, said valve seats having first and second sealing edges, respectively;
first, second and third fluid connections in said valve housing;
a control rod being axially movable in said first and second control guides and said valve housing and having oppositely directed first and second piston surfaces at opposite ends of said control rod;

first and second conical valve pistons having first and second conical surfaces, respectively, and being movably mounted on said control rod and movable in said valve housing relative to said first and second sealing edges, respectively, between closed positions engaging said first and second sealing edges, respectively, and closing fluid communication between said first and second fluid connections, respectively, with said third fluid communication and open positions spaced from said first and second sealing edges, respectively, and opening fluid communication between said first and second fluid connections, respectively, with said third fluid connection;

first and second springs biasing said first and second valve pistons to the closed positions thereof;

first and second radial surfaces on said control rod between said valve pistons engageable with said valve pistons to move said valve pistons independently and separately to the open positions thereof upon axial movement of said control rod in respective axial directions; and valve ducts in said valve elements and control ducts in said control rod providing fluid communication between said first and second fluid connections and longitudinal ends of said control rod.

16. A two-way check valve according to claim 15 wherein said first and second piston surfaces are connected in fluid communication with said first and second fluid connections, respectively, moving said control rod by fluid pressure from said first fluid connection having a higher pressure in a direction to move said first valve piston associated with the first fluid connection out of a closed position to an open position thereof, while second valve piston remains in a closed position.

17. A two-way check valve according to claim 15 wherein said first and second piston surfaces are connected in fluid communication with said second and first fluid connections, respectively, moving said control element by pressure from said first connection having a higher pressure in a direction moving said second valve piston associated with the second fluid connection having the lower pressure out of a closed position to an open position thereof, while the other of the first valve piston remains in a closed position.

18. A two-way check valve according to claim 15 wherein said first and second conical valve pistons have bore holes therein; and said control rod having passages therein that provide fluid communication between the respective fluid connection and the respective piston surface with said bore holes.

19. A two-way check valve according to claim 1 wherein said valve ducts extend from radially outer surfaces of the valve elements to radially inner surfaces of the valve elements.

20. A two-way check valve, comprising:

a valve housing having axially extending and inwardly facing first and second housing guide surfaces therein;

first, second and third fluid connections in said valve housing;

first and second valve elements axially displaceably mounted in said valve housing, said first and second valve elements including first and second conical pistons having first and second conical surfaces, respectively, and including axially extending and outwardly facing element guide surfaces thereon respectively engaging said first and second housing guide surfaces;

a control device controlling displacement of said valve elements in said valve housing;

first and second seats in said valve housing forming leak-tight closures for the respective fluid connections with said first and second valve elements, respectively, said first and second seats including first and second sealing edges, respectively, in said valve housing and engaged by said first and second conical surfaces, respectively, to form said leak-tight closures, said first and second conical pistons being biased by first and second energy storages, respectively, toward closed positions thereof in which said first conical piston seals said first fluid connection and said second conical piston seals said second fluid connection in leak-free manners relative to said third fluid connection, said third fluid connection adjoining said first and second sealing edges; and valve ducts in said valve elements and control ducts in said control device providing fluid communication between said first and second fluid connections and longitudinal ends of said control device.

* * * * *